United States Patent

[11] 3,591,752

| [72] | Inventor | Jorge G. Valdes<br>Wilmington, Del. |
|---|---|---|
| [21] | Appl. No. | 883,207 |
| [22] | Filed | Dec. 8, 1969 |
| [45] | Patented | July 6, 1971 |
| [73] | Assignee | Reynolds Metals Company<br>Richmond, Va. |

[54] APPARATUS FOR MEASURING THE CONDUCTOR AND SHIELD TEMPERATURE OF HIGH VOLTAGE CABLE
12 Claims, 3 Drawing Figs.

[52] U.S. Cl. .................................................. 219/10.77,
219/10.61, 324/54
[51] Int. Cl. .................................................. H05b 1/02,
H05b 5/00
[50] Field of Search .................................................. 219/10.61,
155, 10.77; 324/54

[56] References Cited
UNITED STATES PATENTS

| 3,045,094 | 7/1962 | Coscia et al. | 219/10.77 |
| 3,117,209 | 1/1964 | Peltier | 219/10.61 |
| 3,398,252 | 8/1968 | Bock et al. | 219/10.61 |
| 3,521,018 | 7/1970 | Boeger et al. | 219/10.77 X |
| 3,328,554 | 6/1967 | Biskelborn | 219/10.61 |

*Primary Examiner*—J. V. Truhe
*Assistant Examiner*—L. H. Bender
*Attorney*—Glenn, Palmer, Lyne, Gibbs & Thompson

ABSTRACT: A temperature-sensitive device is placed in contact with the conductor of a measuring loop in order to indirectly measure the temperature in the conductor of a cable undergoing a load cycle test. The temperature of the metallic shield of the cable is measured directly with a temperature-sensitive device in contact therewith. A feedback circuit is provided to automatically control the current input necessary to achieve and maintain a desired conductor temperature throughout the entire load cycle test.

PATENTED JUL 6 1971

3,591,752

INVENTOR.
JORGE G. VALDES

BY Glenn, Palmer, Lyne,
Gibbs & Thompson

HIS ATTORNEYS

APPARATUS FOR MEASURING THE CONDUCTOR AND SHIELD TEMPERATURE OF HIGH VOLTAGE CABLE

BACKGROUND OF THE INVENTION

High voltage cable having a conductor and a surrounding metallic shield separated by semiconductive or nonconductive insulation may require a load cycle test prior to installation to eliminate the possibility of mistakenly installing defective cable in high voltage transmission systems. Since more and more high voltage cable is being installed underground, it is readily apparent that once installed defective cable would be quite expensive to replace, especially in these underground systems. In order to ensure that defects in the cable are detected prior to installation it is desirable to subject at least random samples of the cable to a variety of tests which are designed to simulate the operating conditions of a typical high voltage transmission system. One such test, commonly used by cable manufacturers, is the "load cycle test."

A major problem encountered in load cycle testing of high voltage cable resides in the maintenance of a constant temperature in the conductor of the cable while conducting the load cycle test. It is difficult to maintain the conductor at a constant temperature during the test because the accurate and constant measurement of the conductor temperature cannot be easily recorded as will be hereafter apparent. One factor which causes problems in measuring the temperature is the heavy insulation between the conductor and the metallic shield of the cable. A second factor which complicates the measurement of the conductor temperature is the presence of a high voltage on the conductor during the load cycle test. The high voltage on the conductor makes it difficult, and in some cases virtually impossible to connect a temperature-sensitive device directly to the conductor for accurately measuring the temperature.

Since it is not feasible or practical to directly connect a temperature-sensitive device to the conductor it has become conventional to conduct a preliminary test to measure and record the required current necessary to maintain the conductor at a desired temperature, without the high voltage on the conductor. A temperature-sensitive device can conveniently be placed in direct contact with the conductor when there is no high voltage on the cable. The results of this preliminary test are then used to simulate the heating portion of an actual load cycle test on cable having a high voltage thereon.

A second method of conducting the heat cycle portion of the load cycle test consists of measuring the metallic shield temperature which in a steady state condition is proportional to the conductor temperature and therefrom predicting the resultant conductor temperature. However, in a transient condition the heavy insulation on the conductor and rapid changes in the load condition cause the shield temperature to lag the conductor temperature.

Alternatively, a third method of determining the required current necessary to maintain a desired conductor temperature and the corresponding metallic shield temperature consists of mathematically calculating the magnetic shield temperature and the required current by the following equations:

$$I = \sqrt{\frac{T_c - (T_a + \Delta T_d)}{R_{ac}(R_i + R_j + R_{sa})}} \quad (1)$$

$$T_{sh} = T_c - \Delta T_d - I^2 R_{ac} R_i \quad (2)$$

where:

$I$ = Conductor current (kiloamperes)
$T_c$ = Conductor temperature (degrees centigrade)
$T_{sh}$ = Metallic shield temperature (degrees centigrade)
$T_a$ = Ambient temperature (degrees centigrade)
$\Delta T_d$ = Temperature rise of conductor due to dielectric loss (degrees centigrade)
$R_{ac}$ = Total ac resistance of conductor (microhms per foot)
$R_i$ = Thermal resistance of insulation (thermal ohm-feet)
$R_j$ = Thermal resistance of jacket (thermal ohm-feet)
$R_{sa}$ = Thermal resistance between cable surface and ambient (thermal ohm-feet).

All of the above experimental or mathematical methods predicting the required current necessary to maintain the loaded conductor at a selected temperature during a load cycle test has its obvious shortcomings. Accordingly, a more reliable and accurate method of conducting the heat cycling portion of a load cycling test is desirable.

SUMMARY

My invention provides an improved, accurate and condition responsive apparatus which will induce a current in a cable conductor, measure and record the resultant temperature rise in the conductor and the metallic shield, compensate for inadequate or excessive current and thereby maintain the required current level necessary to quickly attain and maintain a predetermined conductor temperature. With my invention it is possible to measure and record over the entire load cycle test period the cable conductor temperature without grounding the conductor and without connecting a temperature-sensitive device directly to the conductor. Therefore, it can be readily appreciated that the cable can be load cycle tested and the temperature of the conductor measured simultaneously.

Other details and advantages of the invention will become apparent as the following description of the present preferred embodiment thereof in the accompanying drawings proceeds.

DESCRIPTION OF THE DRAWINGS

The accompanying drawings show a present preferred embodiment of this invention. In the drawings.

DESCRIPTION OF THE PRESENT PREFERRED EMBODIMENT

Figure 1:
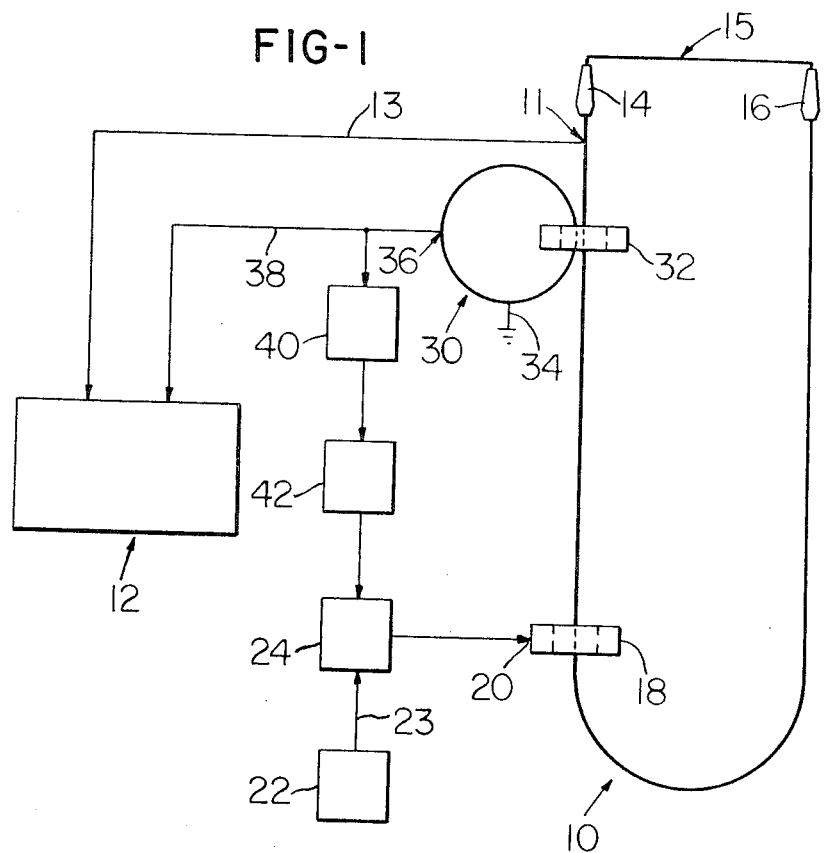
FIG. 1 represents a schematic block diagram of the apparatus which is used for measuring the conductor and metallic shield temperatures of the cable.

Referring now more particularly to FIG. 1 of the drawings, the present preferred embodiment of the invention is shown in schematic. A high voltage cable which is undergoing the heating portion of a load cycle test using my invention is indicated generally by the numeral 10. The metallic shield and the conductor temperature signals of the cable are measured and recorded by a conventional recorder 12.

The metallic shield temperature is measured by placing a temperature sensitive device (thermocouple) at 11 in direct contact with the outer metallic shield of the cable. The temperature signal from the temperature-sensitive device 11 is fed into recorder 12 through lead 13. The conductor temperature of cable 10 is measured by a method that will be more apparent as the description of my apparatus proceeds.

Power supply 22 is provided to drive a saturable core reactor 24 through lead 23. In turn the saturable reactor powers the primary windings 20 of the current transformer 18. The primary windings of the current transformer 18 induce a current in the conductor of cable 10. In order to provide a closed path for the induced current to flow in the conductor of cable 10 is shorted by a connector 15 having terminals 14 and 16. The induced current in the conductor of cable 10 will induce, by the action of current transformer 32, a proportional current in a measuring loop which is indicated generally by the numeral 30. The conductor of cable 10 acts as the primary winding of current transformer 32. The conductor of measuring loop 30 acts as the secondary winding of current transformer 32. The measuring loop, which is formed from a short length of cable of the type undergoing the load cycle test, is made by shorting the cable conductor and open circuiting the metallic shield. The metallic shield is open circuited to avoid inducing a current therein by the action of transformer 32.

The metallic shield and the conductor of the measuring loop 30 are each grounded at 34. Since the conductor of the measuring loop is grounded it is possible to place a temperature sensitive device at 36 in direct contact therewith without damaging the sensor. Typically the current transformer 32 is a 1:1 turn ratio transformer therefore the induced current in the conductor of measuring loop 30 will be proportional to the current flowing in the conductor of cable 10. Since these two currents are proportional, then the conductor temperature of the measuring loop 30 will be at all times proportional to the temperature of the conductor of cable 10. The temperature signal from the temperature-sensitive device 36 is fed into recorder 12 through lead 38. Except for nominal temperature losses, such as the losses in the transformer 32 and the temperature rise due to dielectric losses the temperature of the cable conductor and the temperature of the measuring loop conductor will be equal when a 1:1 turn ratio transformer 32 is used.

The temperature rise due to dielectric losses in the conductor of cable 10 is not measured directly by my apparatus, therefore they may be calculated and added to the conductor temperature signal by the following equation:

$$\Delta T_d = \frac{0.00276 E^2 \epsilon r \cos \phi}{\log (2T+D_c)/D_a} (1/2R_i + R_j + R_{sa}) \quad (3)$$

where:

$\Delta T_d$ = Temperature rise of conductor due to dielectric loss (degrees centigrade)
$E$ = Phase to neutral voltage (60 hertz) (kilovolts)
$\epsilon r$ = Specific inductive capacitance of insulation
$\cos\Phi$ = Power factor of the insulation
$T$ = Insulation thickness (inches)
$D_c$ = Outside diameter of conductor (inches)
$R_i$ = Thermal resistance of insulation (thermal ohm-feet)
$R_j$ = Thermal resistance of jacket (thermal ohm-feet)
$R_{sa}$ = Thermal resistance between cable surface and ambient (thermal ohm-feet).

If the calculated temperature rise due to dielectric losses is significant it may be added to the conductor temperature signal 38 12 recorder 12 to get a true reading of the temperature of the conductor of cable 10. Typically, the temperature rise due to the dielectric loss is less than 3 percent therefore it may be ignored or it may be compensated for in recorder 12 as indicated above, if desired.

Using the apparatus of FIG. 1, as I have described it above, it would be necessary for an operator to constantly manually control the output of the saturable reactor 24 by using readings from the recorder 12 during the entire load cycle test. Under manual operating conditions a relatively high current would be induced in the conductor at the beginning of the load cycle. The operator would gradually reduce the current as the conductor reached its desired temperature. By this method the desired temperature would be attained and maintained in the conductor without overshooting.

If it is desired to operate my invention automatically, I further provide a feedback circuit having a control unit and magnetic amplifier to automatically control the output of the saturable reactor. The control unit 40, which receives its signal from the temperature sensor on the conductor of the measuring loop, drives magnetic amplifier 42 which in turn controls the output of the saturable reactor 24. Using this automatic control the conductor temperature of the cable 10 rises to its desired level in a short time and is maintained at this level during the whole load cycle test without any manual adjustment by an operator.

A conventional timer (not shown) may be provided to turn the load current on and off, thereby eliminating the need for an operator to be present to conduct a continuous load cycle test.

Figure 2:
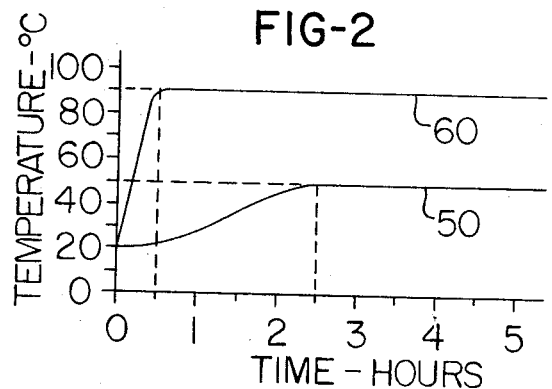
FIG. 2 shows a graph of the recorded conductor and metallic shield temperatures of the cable shown in FIG. 1.

FIG. 2 is a graph which shows the recorded plot of the readings received by recorder 12. The abscissa represents load cycle test time in hours and the ordinate represents the temperature rise in degrees centigrade. The curve 60 represents the temperature rise of the conductor of cable 10 versus time. The curve 50 represents the temperature rise of the metallic shield of cable 10 versus time. It can be seen from the 10 that under a normal load cycle test the conductor attains its desired temperature in a relatively short time compared to the time it takes the metallic shield to reach its corresponding load cycle temperature.

Figure 3:
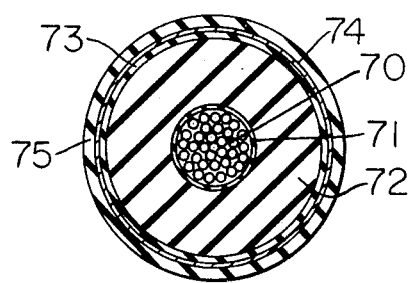
FIG. 3 shows a cross section of a typical high voltage cable which my invention is capable of testing.

FIG. 3 shows the cross section of a typical cable which my invention is designed to test. The cable conductor is shown at 70. The conductor shield is 71 and the conductor insulation is 72. The metallic shield 74 is separated from the conductor insulation by shield insulation 73. The outer surface of the cable is protected by a cable jacket 75.

While the present preferred embodiment of the invention has been illustrated and described, it will be recognized that the invention may be otherwise variously embodied and practical within the scope of the following claims.

What I claim is:

1. Apparatus for measuring the temperature of the metallic shield of a cable and for determining the temperature of the conductor of said cable having a first current flowing therein, comprising a first inductive device associated with said cable for generating a second induced current in said first inductive device proportional to said first current flowing in the conductor and having current conducting means whose temperature is responsive to the second induced current whereby the temperature of said conductive means will be proportional to the temperature of said conductor of said cable, a first temperature-sensitive device for measuring the temperature of said conducting means and generating a first signal proportional thereto, a second temperature-sensitive device in contact with said metallic shield for measuring the shield temperature and for generating a second signal proportional thereto, and means for recording said signals.

2. Apparatus as set forth in claim 1 in which said first inductive device is a current transformer wherein the conductor of the cable forms the primary winding and said current conducting means forms the secondary winding of the transformer.

3. Apparatus as set forth in claim 2 in which said first temperature-sensitive device is in direct contact with said current conducting means.

4. Apparatus as set forth in claim 3 in which said cable and said current conducting means are substantially identical in cross section.

5. Apparatus as set forth in claim 1 in which the magnitude of the first current flowing in the conductor is regulated by a feedback system comprising, means connected to said first temperature-sensitive device for using said first signal to regulate and control the first current flowing in said conductor.

6. Apparatus as set forth in claim 1 further including a second inductive device for inducing said first current in said conductor.

7. Apparatus as set forth in claim 6 in which the magnitude of the first current flowing in the conductor is regulated by a feedback system comprising, means connected to said first temperature-sensitive device and to said second inductive device for using said first signal to regulate and control the power input into said second inductive device.

8. Apparatus as set forth in claim 7 further including a timer for cyclically regulating the power supplied to said second inductive device.

9. Apparatus as set forth in claim 8 further including a power source connected to said second inductive device.

10. The method of load cycle testing a voltage cable having a first conductor and a first metallic shield comprising the steps of:

a. causing a current to flow in said first conductor thereby generating a first temperature signal indicative of the temperature of said first metallic shield, b. inducing a current in an associated second conductor of a measuring loop, thereby generating a second temperature signal indicative of the temperature of said second conductor, c. measuring the first temperature signal of said metallic shield, and
d. measuring the second temperature signal of said second conductor of said measuring loop.

11. The method of claim 10 further comprising the step of:
a. recording the first and the second temperature signals.

12. The method of claim 10 further comprising the steps of:
a. providing a source of power to cause said current to flow in said conductor,
b. providing a feedback circuit for sensing the second temperature signal, and
c. connecting said feedback circuit to said second conductor of the measuring loop and to said power source to provide an automatic control for the power source.